United States Patent [19]
Stoddard et al.

[11] Patent Number: 5,757,214
[45] Date of Patent: May 26, 1998

[54] PWM DRIVER FOR AN INDUCTIVE LOAD WITH DETECTOR OF A NOT REGULATING PWM CONDITION

[76] Inventors: Robert J. Stoddard, 8 Willarch Rd., Lincoln, Mass. 02193; Roger C. Peppiette, 24 Woodhall Bank, Collington, Edinburgh, Scotland, EH13OHJ

[21] Appl. No.: 647,851

[22] Filed: May 15, 1996

Related U.S. Application Data

[60] Provisional application No. 60/001,238, Jul. 19, 1995.
[51] Int. Cl.$^6$ .................. H03K 17/16; H03K 3/01
[52] U.S. Cl. .................. 327/110; 327/427; 323/282
[58] Field of Search .................. 327/110, 309, 327/312, 327, 427; 323/282, 283, 284

[56] References Cited

U.S. PATENT DOCUMENTS

| | | | |
|---|---|---|---|
| 4,908,562 | 3/1990 | Back | 318/696 |
| 5,057,765 | 10/1991 | Clark et al. | 323/288 |
| 5,576,648 | 11/1996 | Rossi | 327/110 |
| 5,663,667 | 9/1997 | Blum | 327/110 |

OTHER PUBLICATIONS

SGS Thompson–Thomson Microelectronics (technical bulletin) Jun. 1994, pp. 1/14 through 14/14.

*Primary Examiner*—David C. Nelms
*Assistant Examiner*—Son Mai

[57] ABSTRACT

A pulse width modulated (PWM) transistor driver circuit, for driving an inductive load, has a load-current sensing resistor and a comparator having an input connected to the sensing resistor and another input to which a PWM control reference voltage may be applied. A PWM driver-control circuit includes a set-dominant PWM latch, and a not_ regulating detector that may be composed entirely of logic circuit blocks or a combination of logic and analog circuits. By either means, the PWM bridge-control circuit includes a timer for repeatedly generating control pulses that set and hold a PWM latch beginning each PWM period, and the comparator resets the latch each time after the timer pulse the load current rises to exceed a corresponding reference voltage level. A sample-time-interval is defined beginning at the time of termination of a control pulse and a not_ regulating pulse generator produces a not_regulating pulse only during the sample-time when the load current exceeds the level of the applied reference signal, indicating that the PWM system is failing to regulate the load current. Further, the not_reg pulse width is, under most load conditions and over a wide range of applied reference voltage levels, a measure of the degree of failure of the PWM driver to regulate.

15 Claims, 14 Drawing Sheets

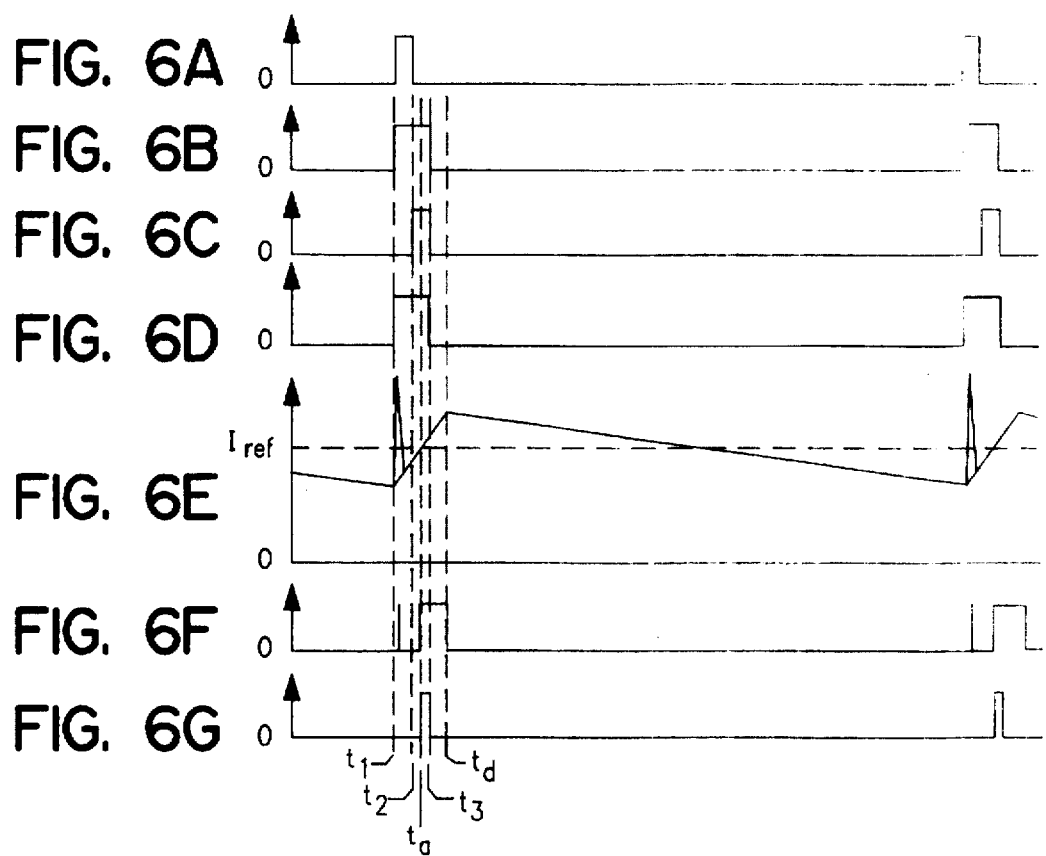

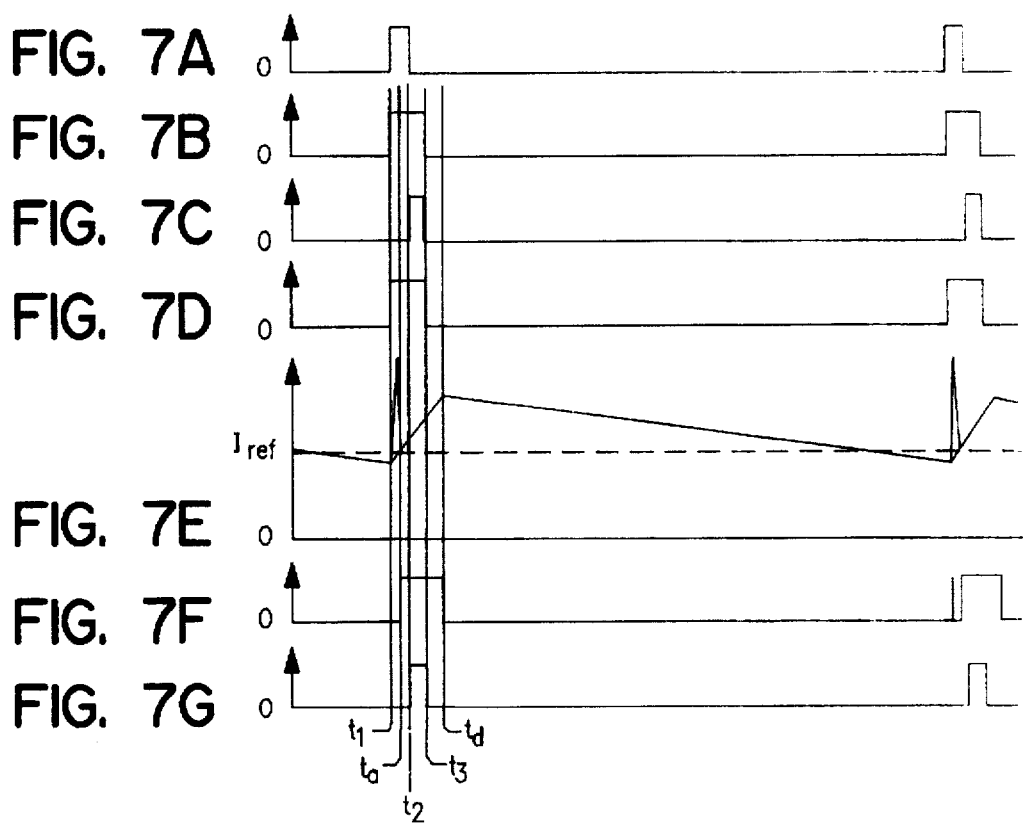

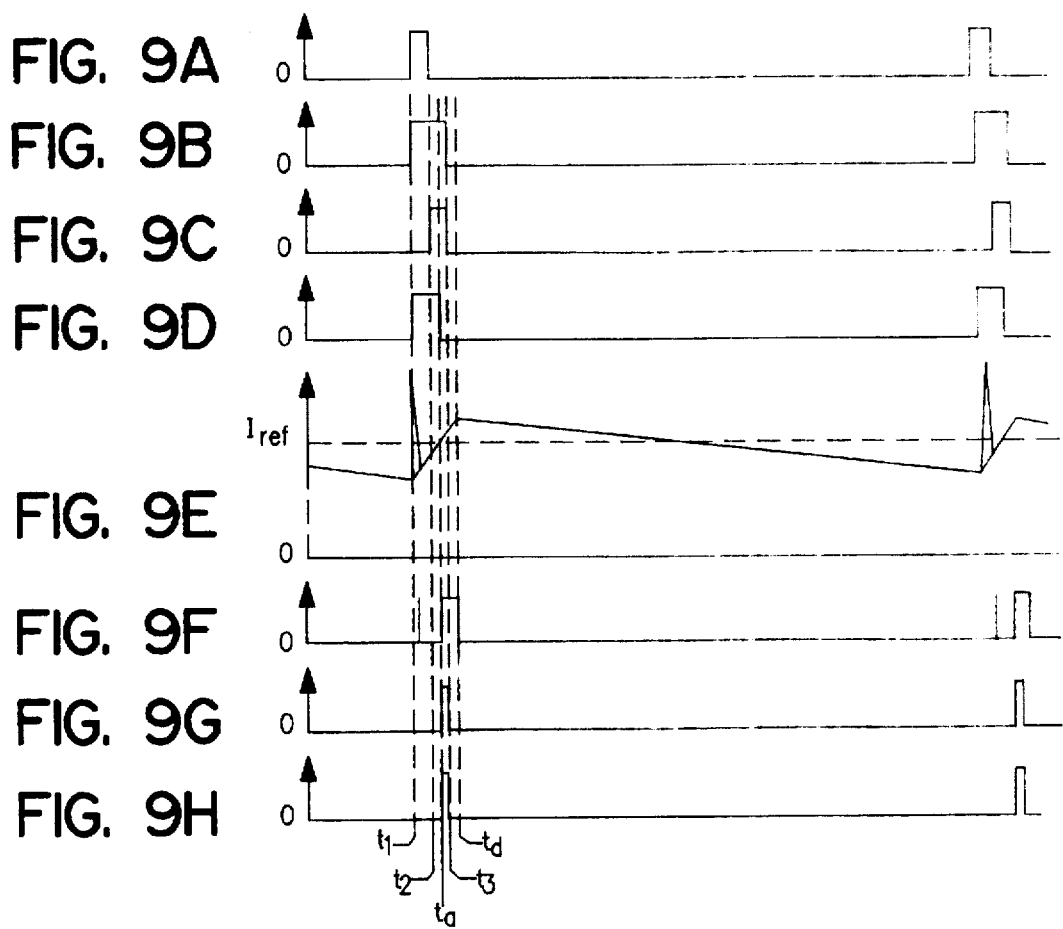

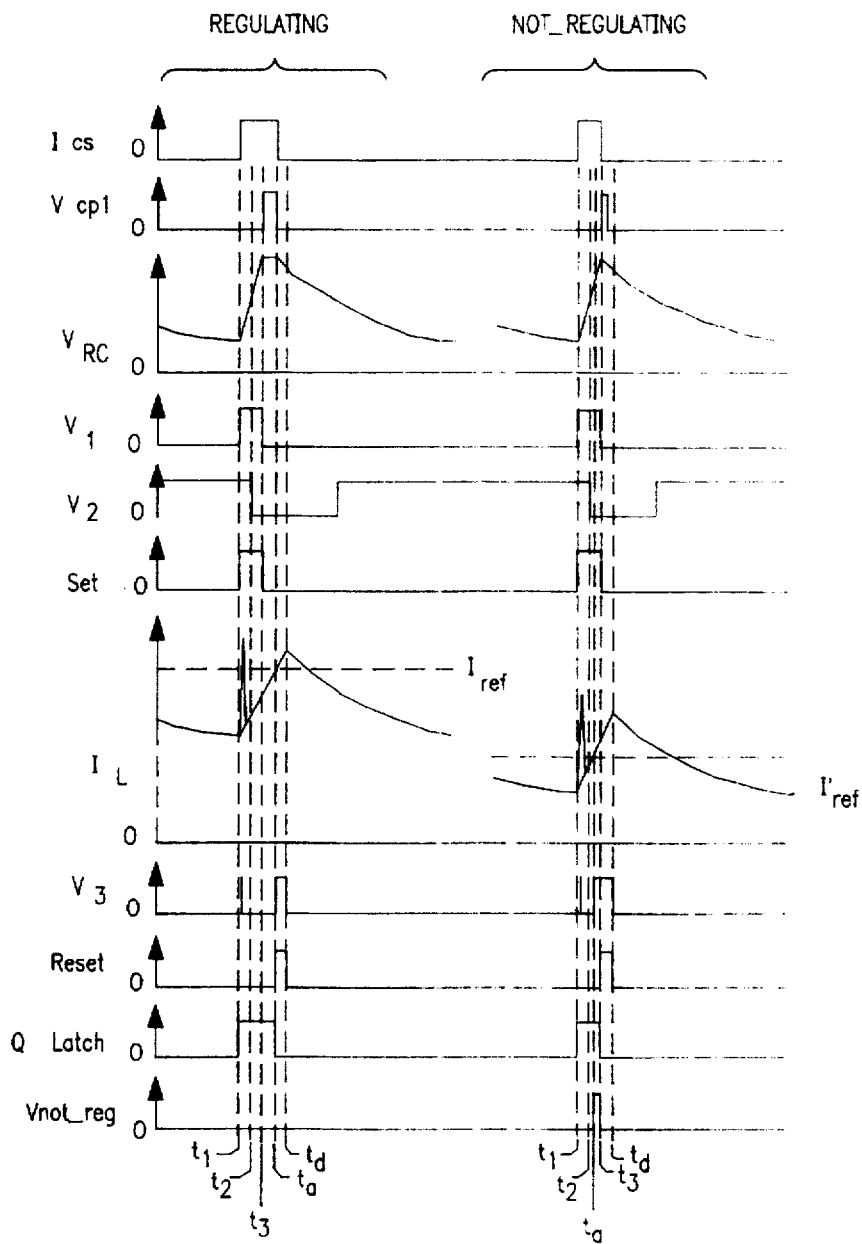

PWM DRIVER FOR AN INDUCTIVE LOAD WITH DETECTOR OF A NOT REGULATING PWM CONDITION

REFERENCE TO RELATED APPLICATIONS

This is a Complete Application of Provisional Application Serial No. 60/001,238 filed Jul. 19, 1995.

BACKGROUND

This invention relates to a pulse-width-regulated (PWM) bridge driver for an inductive load, and more particularly to such a driver having a PWM controller providing circuit means for mixing two and four quadrant chopping during the PWM off-time.

The simple prior art PWM driver of FIG. 1, employing a single driver transistor and having an inductive load, illustrates problems common to both prior art single transistor inductive-load PWM drivers and four-transistor bridge inductive-load PWM drivers. Wave forms of signals in the PWM driver of FIG. 1 are shown in FIGS. 3a, 3b, 3c and 3d.

A driver transistor 10 has a load 12 connected between the collector and the +Vcc bus. A load-current sensing resistor 14 is connected from emitter to the ground bus, serving as a current-to-voltage transducer to produce a sensing voltage that is proportional to the peak load current, $I_L$ in FIG. 3b. The PWM control circuitry includes a timer (or clock) 16 for generating timer pulses (FIG. 3a) at the set-input of a latch (or flip flop) 18. Feedback via conductor 17 from the output of the PINM latch 18 to the timer 16 is optional for keeping constant the duration of the PWM off-time in each PWM period, whatever the width of the PWM on-time may be.

A comparator 20 has one input connected to the sensing resistor 14 and another input connected to a reference-signal input terminal 22. During operation of this PWM control circuit, timer pulses are periodically applied at times $t_1$ by the timer 16 to the set input of the set-dominated latch 18. Each set pulse at time $t_1$ triggers the latch 18 which gates on the transistor 10, by gating pulses as in FIG. 3d. A PWM period is therefore the reciprocal of the frequency of the timer pulses, i.e. the interval between successive times $t_1$.

The load current through the inductive load 12, transistor 10 and sensing resistor 14 rises as governed by equation $dI/dt = (Vbb - V_{SAT} - V_{BEMF} - (I_L(Rs+R_L)))/L$, where Vbb is the load supply voltage, $V_{SAT}$ is the voltage drop across the driving transistor 10, $V_{BEMF}$ is the back electromotive force (if any), $I_L$ is the current through the inductive load 12, $R_L$ is the series resistance of the inductive load, Rs is the resistance of the sensing resistor 14, and L is the inductance of the inductive load. The load current thus rises exponentially, asymptotically approaching a value given by $(Vbb - V_{SAT} - V_{BEMF})/(Rs + R_L)$.

When at times $t_a$ the sense voltage across the sensing resistor 14 reaches the value of the reference voltage that is being applied to the PWM driver control input terminal 22, the comparator produces a reset pulse, as in FIG. 3c. Each reset pulse resets the latch, in each instance terminating gating pulses (FIG. 3d) generated from the "Q" output of latch 18. Consequently, the on-times of the PWM-controlled load current, $I_L$, and thus of the sensed current, Is, are directly related to the reference-signal input voltage, $V_{ref}$ in the large region of good regulation of the load current IL. Thus in this region, the average load current $I_{Lav}$ is also directly related to $V_{ref}$.

Consideration must be given to the fact that, at each time $t_1$ when the transistor turns on, and before there is time for the current through the inductive load to have risen substantially, a large spike of current flows through the sensing resistor 14, tending to immediately reset the latch 18, defeating control of load current by the applied reference voltage.

In the patent to A. W. Clark and B. A. Zacker, U.S. Pat. No. 5,057,765, issued Oct. 15, 1991, there is described one method for causing the control circuit to ignore this spike. This is accomplished by generating blanking pulse from $t_1$ to $t_2$ used for blocking any reset signal from the sensing comparator reaching the reset input of a simple set/reset latch that gates on and off the driver transistor. This patent is assigned to the same assignee as is the present invention.

Alternatively, a latch 18 employed in FIG. 1 may be of the kind to be held latched on after each set pulse for a fixed time that is commensurate with the expected duration of the current spike. Such a latch is known as a set-dominated latch in which application of a reset signal is ineffective during the application of a set pulse, namely from times $t_1$ to $t_2$. The maximum pulse width of current spikes is typically half a microsecond, and in that case the width of the spike-blanking set pulse may then be conservatively fixed at one or two microseconds.

The current spike is basically attributable to the driving of an inductive load 12, comprised of an inductor 24 having an associated resistance represented by resistor 25. When using an inductive load, it is conventional to employ a fly-back diode 26 for preventing damage to the driver transistor 10 during periods just after driver transistor 10 shuts of. The flyback diode 26 then becomes forward biased and shunts the current caused by the back-voltage across the inductor 24 (additionally including the back electromotive force, BEMF, when the inductor is a motor or solenoid), and prevents a large positive back voltage from appearing at the collector of driving transistor 10. This shunted inductor current then decays until the transistor 10 turns on again. When the driver transistor 10 subsequently turns on, the inductor current just having flowed through the diode 26 leaves in the PN junction thereof a stored charge which now discharges as a spike 15 of current through the just turned on driver transistor 10 through the sensing resistor 14. Also contributing at times $t_1$ to this current spike of diode recovery charge are discharges from previously charged stray capacitances in the circuit wiring, in the collector-base junction of driver transistor 10, and capacitances across the inductive load 12 and diode 26.

As is indicated in FIG. 2, such inductive-load PWM driver circuits regulate well over a wide range of operating conditions. Over this range the average load current $I_{Lav}$ is approximately a linear function of the reference voltage $V_{ref}$ and for the higher values of $V_{ref}$ the average value of the load current $I_{Lav}$ (curve 28) is displaced slightly from the ideally regulated average load current (curve 29) because PWM control actually regulates with respect to peak load current in each PWM period, the load current peak corresponding to $I_{ref}$ in FIG. 3b, where $I_{ref} = V_{ref}/Rs$. However, regulation deteriorates at low values of reference voltage, e.g. at below a certain low value of $V_{ref}$ the corresponding load current $I_{Lav}$ tends not to drop any longer and to remain fixed at a low current value. $I_{Leq}$. The reasons for this are explained further in our provisional patent application Ser. No. 60/001,234, entitled PWM INDUCTIVE-LOAD BRIDGE DRIVER WITH MIXED TWO AND FOUR QUADRANT CHOPPING DURING PWM OFF-TIME, filed simultaneously with our provisional patent application 60/001,234, which provisional applications are assigned to the same assignee as is the present complete application.

It is therefore an object of this invention to provide, in a PWM controlled driver for an inductive load, a detector of the occurrence of a non-regulating PWM operating condition for producing a distinctive "not_regulating" signal to make it possible to automatically compensate for this condition or simply to provide a warning that it exists.

It is a further object of this invention to provide such a PWM-driver detector for producing a not_regulating signal having a parameter that is proportional to the degree of failure to regulate.

SUMMARY OF THE INVENTION

A pulse width modulated (PWM) driver circuit for driving an inductive load includes a switching driver transistor, a pair of driver-circuit load terminals to which a load may be connected, and a load-current sensing element for producing a sense voltage that is directly related to the load current. The transistor and pair of load terminals are connected in series between a pair of DC supply voltage busses.

There is further included a PWM reference-signal input conductor to which a driver-control reference voltage may be applied, and a sense-comparator having one input connected to the sensing element and having another input connected to the reference-signal input conductor for producing at time $t_a$ a pulse at the output of the sense-comparator when the sense voltage exceeds the applied reference voltage.

A PWM control circuit connected to the output of the sense-comparator has an output connected to the control element of the switching driver transistor for repeatedly producing at times $t_1$ control pulses to turn on and hold on the driver transistor at least for a predetermined minimum time interval $t_1$ to $t_2$ and otherwise for the time interval $t_1$ to $t_a$. The PWM control circuit therefore ignores the load current spike at $t_1$.

A sample-time-termination logic means connected to the PWM bridge-control circuit for producing a sample-time-termination logic-level transition at $t_3$ which is later than $t_2$, to define a sample time interval $t_2$ to $t_3$ during each PWM period between control pulses.

A not_regulating pulse generator means has one input connected to the output of the sample-time-termination logic means and has another input connected to the output of the sense-comparator for producing a not_reg pulse only during a sample-time, $t_2$ to $t_3$, when the load current rises to the point at which the sense voltage exceeds the applied reference voltage, and the duration of the not_reg pulse within the sample time can be indicative of the degree by which regulation is not being realized.

BRIEF DESCRIPTION OF THE DRAWINGS

FIG. 5a shows a waveform of the timer signal.

FIG. 5b shows a waveform of the output signal from the pulse extend circuit 46, which is also the set pulse to the latch 38.

FIG. 5c shows a waveform of the sample-pulse signal at the output of the AND gate 48.

FIG. 5d shows a waveform of the gating pulse at the output of the latch 38.

FIG. 5e shows a waveform of load current having superimposed thereon the sensed-current spikes coincident with the leading edges of the respective set pulses.

FIG. 5f shows a waveform of the reset signal at the output of the comparator 40.

FIG. 5g shows a waveform of the not_regulating signal at the output of the AND gate 52.

FIGS. 6a through 6g show waveforms in the driver of FIG. 4 for a reduced level of applied reference voltage, $V_{ref}$.

FIG. 6a shows a waveform of the timer signal.

FIG. 6b shows a waveform of the output signal from the pulse extend circuit 46, which is also the set pulse to the latch 38.

FIG. 6c shows a waveform of the sample-pulse signal at the output of the AND gate 48.

FIG. 6d shows a waveform of the gating pulse at the output of the latch 38.

FIG. 6e shows a waveform of load current having superimposed thereon the sensed-current spikes coincident with the leading edges of the respective set pulses.

FIG. 6f shows a waveform of the reset signal at the output of the comparator 40.

FIG. 6g shows a waveform of the not_regulating signal at the output of the AND gate 52.

FIGS. 7a through 7g show waveforms in the driver of FIG. 4 for a further reduced level of applied reference voltage, $V_{reg}$.

FIG. 7a shows a waveform of the timer signal.

FIG. 7b shows a waveform of the output signal from the pulse extend circuit 46, which is also the set pulse to the latch 38.

FIG. 7c shows a waveform of the sample-pulse signal at the output of the AND gate 48.

FIG. 7d shows a waveform of the gating pulse at the output of the latch 38.

FIG. 7e shows a waveform of load current having superimposed thereon the sensed-current spikes coincident with the leading edges of the respective set pulses.

FIG. 7f shows a waveform of the reset signal at the output of the comparator 40.

FIG. 7g shows a waveform of the not_regulating signal at the output of the AND gate 52.

FIGS. 9a through 9h show waveforms in the driver of FIG. 8 for a moderate level of applied reference voltage, $V_{ref}$.

FIG. 9a shows a waveform of the timer signal, which is also the set pulse to the latch 38.

FIG. 9b shows a waveform of the output signal from the pulse extend circuit 46.

FIG. 9c shows a waveform of the sample-pulse signal at the output of the AND gate 48.

FIG. 9d shows a waveform of the gating pulse at the output of the latch 38.

FIG. 9e shows a waveform of load current having superimposed thereon the sensed-current spikes coincident with the leading edges of the respective set pulses.

FIG. 9f shows a waveform of the reset signal at the output of the comparator 40.

FIG. 9g shows a waveform of the not_regulating signal at the output of the AND gate 52.

FIG. 9h shows a waveform of the not_regulating signal at the output of the latch 55.

FIG. 10a shows a waveform of the timer signal, which is also the set pulse to the latch 38.

FIG. 10b shows a waveform of the output signal from the pulse extend circuit 46.

FIG. 10c shows a waveform of the sample-pulse signal at the output of the AND gate 48.

FIG. 10d shows a waveform of the gating pulse at the output of the latch 38.

FIG. 10e shows a waveform of load current having superimposed thereon the sensed-current spikes coincident with the leading edges of the respective set pulses.

FIG. 10f shows a waveform of the reset signal at the output of the comparator 40.

FIG. 10g shows a waveform of the not_regulating signal at the output of the AND gate 52.

FIG. 10h shows a waveform of the not_regulating signal at the output of the latch 55.

FIG. 11a shows a waveform of the timer signal, which is also the set pulse to the latch 38.

FIG. 11b shows a waveform of the output signal from the pulse extend circuit 46.

FIG. 11c shows a waveform of the sample-pulse signal at the output of the AND gate 48.

FIG. 11d shows a waveform of the gating pulse at the output of the latch 38.

FIG. 11e shows a waveform of load current having superimposed thereon the sensed-current spikes coincident with the leading edges of the respective set pulses.

FIG. 11f shows a waveform of the reset signal at the output of the comparator 40.

FIG. 11g shows a waveform of the not_regulating signal at the output of the AND gate 52.

FIG. 11h shows a waveform of the not_regulating signal at the output of the latch 55.

FIG. 15a shows a waveform of the current, Ics, in the switched current source 70.

FIG. 15b shows a waveform of the logic signal output from the clamp circuit 80.

FIG. 15c shows a waveform of the charging voltage, $V_{RC}$, across the external charging capacitor 82.

FIG. 15d shows a waveform of the logic signal V1.

FIG. 15e shows a waveform of the logic signal V2.

FIG. 15f shows a waveform of the set signal to the PWM latch 90.

FIG. 15g shows a waveform of load current having superimposed thereon the sensed-current spikes coincident with the leading edges of the respective set pulses.

FIG. 15h shows a waveform of the logic signal V3.

FIG. 15j shows a waveform of the reset signal at the output of the comparator 92.

FIG. 15k shows a waveform of the gating pulse from the Q output of the PWM latch 90.

FIG. 15m shows a waveform of the not_regulating signal at the output of the AND gate 100.

DESCRIPTION OF THE PREFERRED EMBODIMENTS

Figure 4:
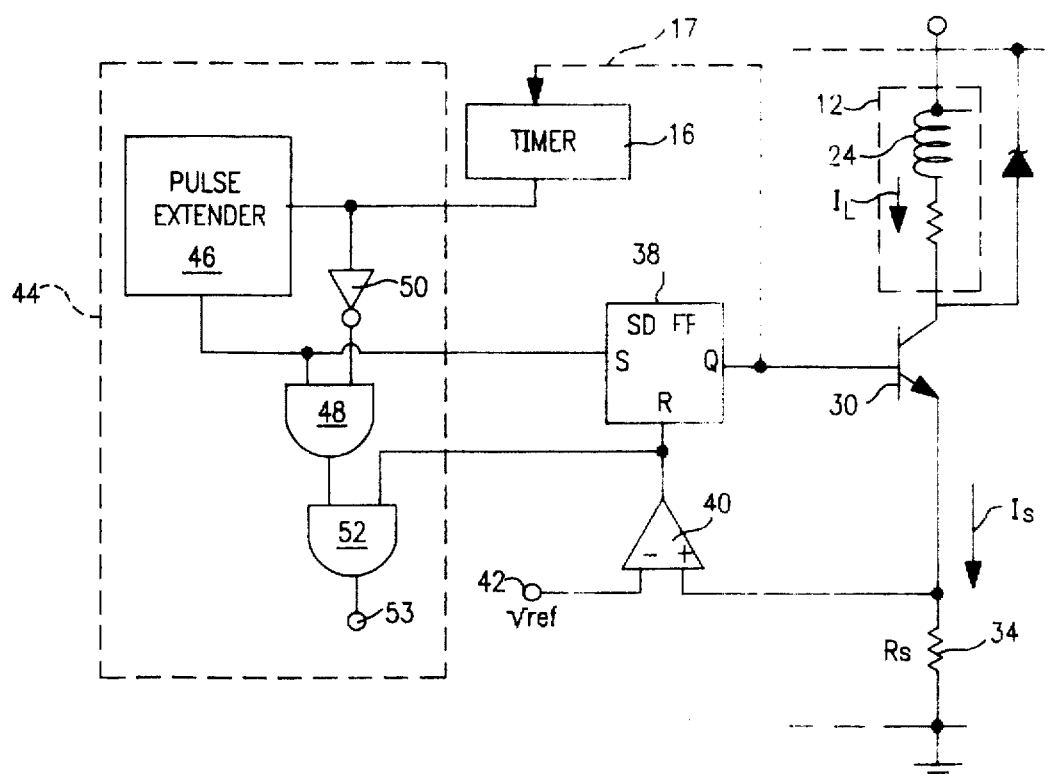
FIG. 4 shows a circuit diagram of a first preferred embodiment of a PWM controlled driver of this invention.

Referring to FIG. 4, a driver transistor 30 has a load 12 connected between the collector and the +Vcc bus. A load-current sensing resistor 34 is connected from emitter of transistor 30 to the ground bus, serving as a current-to-voltage transducer to produce a sensing voltage that is proportional to the load current $I_L$ when transistor 30 is on.

Figure 1:
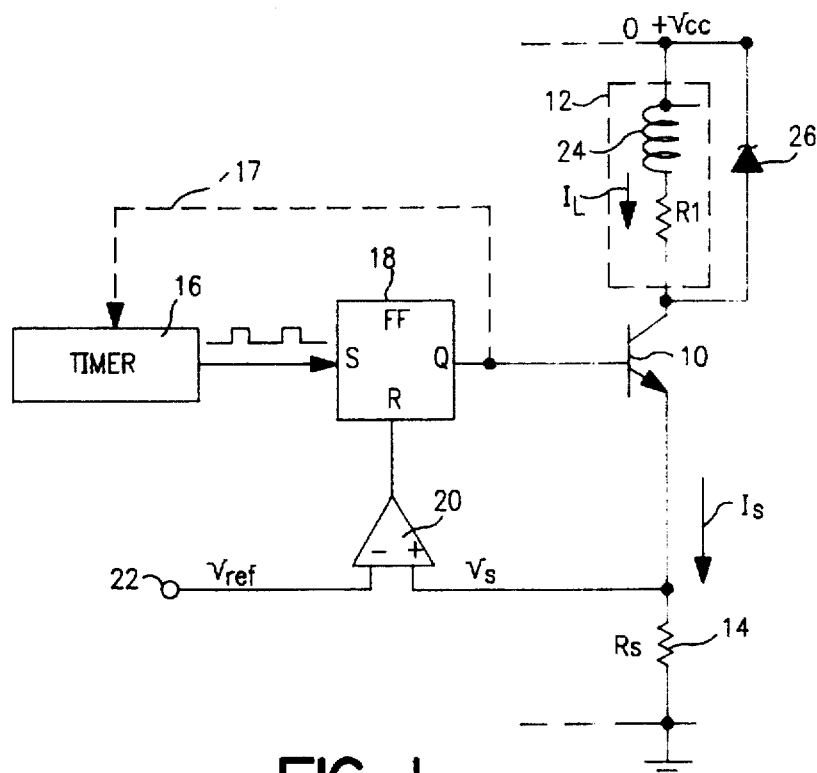
FIG. 1 shows a circuit diagram of a PWM driver of the prior art with an inductive load.

In FIG. 4, there has been added to the conventional driver circuit of FIG. 1 an ancillary circuit 44 comprised of interconnected logic blocks accepting binary logic input signals and producing binary logic output signals, as are produced e.g. by the timer 16, comparator 40 and latch 38.

Figure 5A:
FIGS. 5a through 5g show waveforms in the driver of FIG. 4 for a moderate level of applied reference voltage, $V_{ref}$.

The timer 16 generates timer pulses at times $t_1$ (FIG. 5a), are introduced at the input of the pulse extender 46. The output of the pulse extender 48 (FIG. 5b) is connected to the set input of the set-dominated PWM latch 38 and thus sets the latch 38 and initiates the drive transistor gating pulse (FIG. 5d). The AND gate 48 produces a sample-time pulse (FIG. 5c). The comparator 40 has one input connected to the sensing resistor 34 and another input connected to a reference-signal input terminal 42. Comparator 40 is for generating, at times $t_a$, reset pulses (FIG. 5f) to latch off latch 38 which then terminates the drive-transistor gating pulse (FIG. 5d). This occurs when $Vs=V_{ref}$ and since $Is=Vs/Rs$ when $Is=V_{ref}/R_s$, where $V_{ref}$ is the control or reference voltage applied at terminal 42, and where $R_s$ is the resistance of the sensing resistor 34.

Figure 2:
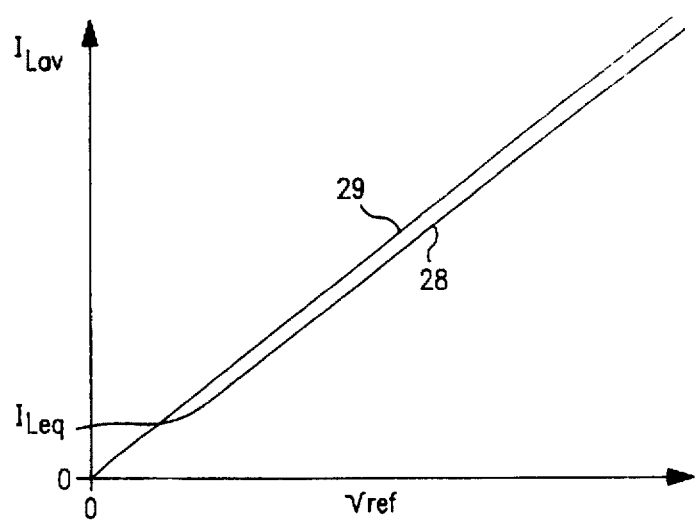
FIG. 2 shows in a graph of average load current versus the applied reference voltage, the curve 28 characterizing PWM load current regulation in the driver circuit of FIG. 1 and the curve 29 characterizing the corresponding ideal PWM load current regulation.
Figure 3:
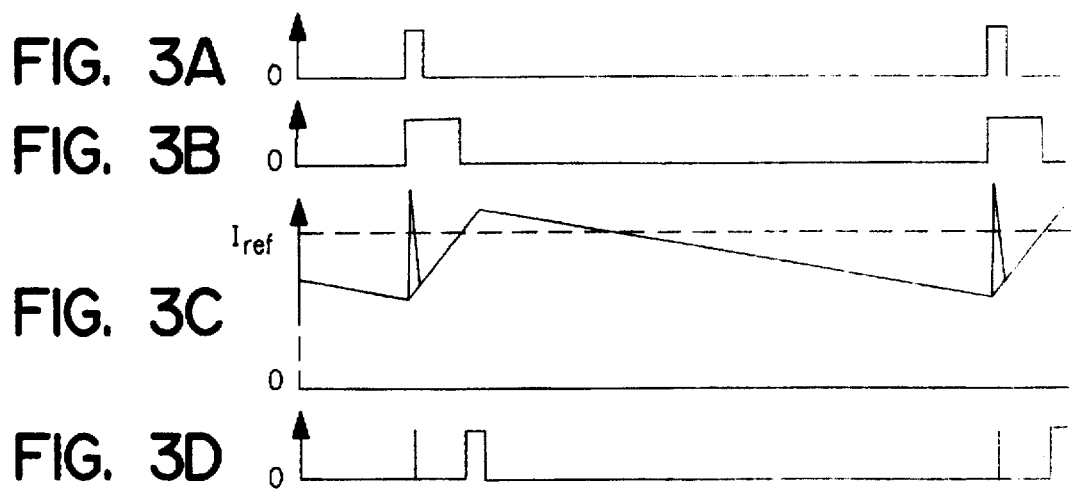
FIG. 3a shows a waveform of the timer signal including set pulses for periodically setting the latch in the driver of FIG. 1.
FIG. 3b shows a waveform of the latch output signal including gating pulses for turning on the driver transistor in the driver circuit of FIG. 1.
FIG. 3c shows a waveform of the load current having superimposed thereon the sensed-current spikes coincident with the leading edges of the respective set pulses, in the driver of FIG. 1.
FIG. 3d shows a waveform of the reset signal at the output of the comparator in the driver of FIG. 1.

The waveforms of logic signals and load current shown in FIGS. 3a through 3d are representative of operation in the linear regulating range (as in curve 28, FIG. 2) of the prior-art driver circuit of FIG. 1. The waveforms of logic signals and load current shown in FIGS. 5a through 5g are representative of operation in the linear regulating range (as in curve 28, FIG. 2) of the circuit of FIG. 4.

However, at low levels of the applied reference voltage $V_{ref}$ poor PWM regulation is experienced in both the prior art circuit of FIG. 1 as well as that of FIG. 4 because after each instance that the driver transistor 30 is turned on, the load current reaches the reference voltage $V_{ref}$ at time ta, before the timer pulse has terminated at $t_2$.

In FIG. 4, ancillary circuit 44 is a detector of occurrences wherein the load current is not being regulated by the PWM driver circuit, and more particularly when during a PWM period (at time $t_a$) the sense-voltage (Vs) across the load-current sensing resistor 34 exceeds the applied reference voltage ($V_{ref}$) prior to the set pulse (to the PWM latch 38) going low at $t_3$.

The latch 38 is repeatedly set and held on by the timer pulses at times $t_1$ for producing at the PWM latch output the gating pulses, as shown in FIG. 5d, that periodically gate on the transistor 30. The applied reference voltage is high enough that the rising load current $I_L$ reaches $I_{ref}$ at time $t_a$, which is later than the trailing edge of the extender pulse at $t_3$, a condition leading to good peak-current regulation.

The term "proper" or "good" regulation is defined herein as meaning that the excess of peak load current, i.e. that which exceeds $I_{ref}$ is attributable only to the switching delays in driver circuitry from the time that the Q output of PWM latch goes low to the time that the output driving transistors actually turn off, and not to any other inadequacies attributable to the PWM control circuit.

Optimum regulation that may be achieved in such a PWM peak-load-current controlled driver circuit would occur if the driver transistor were to turn off at the instant $t_a$ the load current reaches and does not exceed the voltage $V_{ref}$ across the sensing resistor 34 corresponding to $I_{ref}$. In practice however, at least because of signal delays in the control circuit portion of the driver, some small amount of "excessive" load current always occurs before driver turn off is effected at time $t_d$.

In the ancillary detector circuit 44, the pulse-extender circuit 46, e.g. a standard one-shot multivibrator circuit, has an input connected to the output of the timer 16, and produces an extended pulse (FIG. 5b) from $t_1$ to $t_3$. Pulse extender 46 has an output connected to an input of AND gate 48 and to the set input of the PWM latch 38. The output of the AND gate 48 is a sample-pulse (FIG. 5c) enduring from $t_2$ to $t_3$. A second AND gate 52 has one input connected to the output of the AND gate 48 and the other input connected to the output of the comparator 40.

Figure 5B:
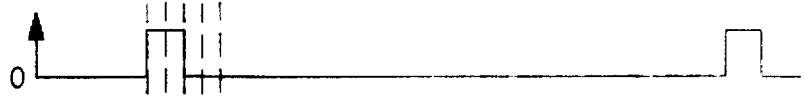
Figure 5C:
Figure 5D:
Figure 5E:
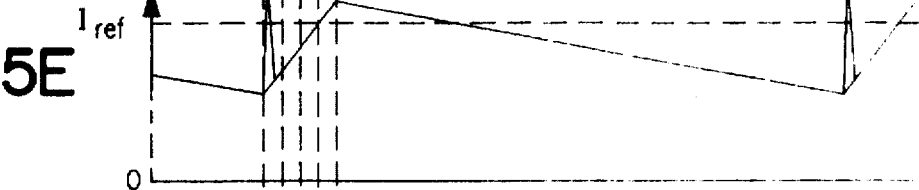
Figure 5F:
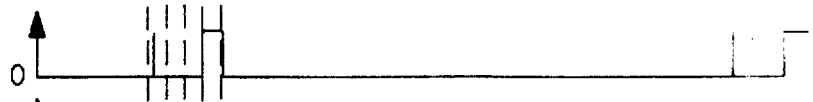
Figure 5G:

Waveforms in the circuit of FIG. 4 are shown in FIGS. 5a through 5g wherein the applied $V_{ref}$ is at a moderate level at which that Vs (the voltage across the sense resistor 34) reaches $V_{ref}$ at the time $t_a$ after the termination at time $t_3$ of the set pulse (FIG. 5b). Thus FIGS. 5a through 5g represent operation of the driver circuit of FIG. 4 under conditions for which proper PWM regulation is obtained, in which case there will not be coincidence between a sample pulse (FIG. 5c) and a high-logic output from the comparator 40 (FIG. 5f)

indicating that Vs does not exceed $V_{ref}$ within the sample time $t_2$ to $t_3$. The output reset signal from the comparator 40 is comprised simply of normal reset impulses for resetting the latch 38 and turning off the driver transistor 30 when the load current has reached a point at time $t_a$ (occurring after $t_3$) when the sense-voltage Vs equals the applied $V_{ref}$ where $Vs=Is\cdot Rs$.

The gated driver transistor typically shuts off at a delayed time $t_d$ after $t_a$, as noted above. For moderate to high levels of $I_{ref}$ as represented in FIG. 5e, $t_a$ occurs after $t_3$ resulting in good peak load current regulation. Regulation would be "perfect" were it not for the driver-transistor delay in turning off. Thus during this good PWM regulation as illustrated in FIGS. 5a–5g, there will be no pulses (FIG. 5g) in the not_regulating signal at the output of AND circuit 52 or at terminal 53.

Waveforms in the circuit of FIG. 4 are shown in FIGS. 6a through 6g wherein the applied $V_{ref}$ is at low level at which Vs (the voltage across the sense resistor 34) reaches $V_{ref}$ at the time $t_a$ before the termination at time $t_3$ of the set pulse (FIG. 6b) and during the sample time (from $t_2$ to $t_3$). Thus FIGS. 6a through 6g represent operation of the driver circuit of FIG. 4 under conditions for which less than proper PWM regulation is obtained, in which case there will be coincidence between a sample pulse (FIG. 6c) and a high-logic output from the comparator 40 (FIG. 6f) indicating that Vs does exceed $V_{ref}$ within the sample time $t_2$ to $t_3$.

The extend pulse (FIG. 6b) prevails in keeping the set dominant latch 38 on (from $t_a$ to $t_3$) even though a reset pulse (FIG. 6f) was initiated at time $t_a$. The load current continues to rise for an additional amount of time, i.e. from $t_a$ to $t_3$, above and beyond the rise due to the turn-off delay of the driver transistor after the gating pulse from the Q output of latch 38 goes low at $t_3$ (FIG. 6d) resulting in excessive over-current. The driver 30 belatedly turns off and the load current begins to decay at $t_d$ (FIG. 6e).

The sample pulse (FIG. 6c) from AND gate 48 becomes partly or wholly coincident with a comparator output pulse (FIG. 6f). The duration of this coincidence is an interval, $t_a$ to $t_3$. During this coincidence interval, the voltage Vs across load-current sensing resistor 34 exceeds the reference voltage $V_{ref}$, but the duty cycle of the PWM controller can not be affected because the extend pulse is forcing the PWM latch 38 to remain set.

There is then produced at the output of the AND gate 52 a not_regulating signal, of width $t_a$ to $t_3$, that warns that the load current $I_L$ is not being properly regulated by the PWM driver circuit. Furthermore the width of the not_regulating pulse, the duty factor of the not_regulating pulse, and the average voltage of the total not_regulating signal (FIG. 6g) from AND gate 52, are each measures of the degree to which failure to regulate is being experienced.

However, these not_regulating-signal measures of the degree of failure to regulate properly, are only realized when the degree of not_regulating ranges from zero to a moderate degree, as can be seen from the more severe non-regulation condition illustrated in the series of FIGS. 7a, 7b, 7c, 7d, 7e, 7f and 7g representing respectively, timer signal, extend pulse, sample-time signal, gating signal, load current, reset signal, and the not_reg signal.

The reference voltage $V_{ref}$ applied to the circuit of FIG. 4 is so low that the time $t_a$, at which the excessive load current begins to occur, is prior to the time $t_2$ at which the sample pulse (FIG. 7c) begins to occur. Now the width of the not_regulating pulse (FIG. 7g) remains fixed for all such lower currents. Under these conditions the not_reg pulses have a fixed width, from $t_2$ to $t_3$ as in FIG. 7g, and proportionality between the not_regulating signal duty factor and the degree of failure to regulate is no longer present.

Nevertheless, the situation described by the waveforms in FIGS. 6a through 6f, wherein the period of excess load current exists for a relatively short time (from $t_a$ to $t_3$), represents an operating area of marginal failure of the PWM control circuit to regulate the load current. It is in this operating area in which the proportionality feature between the pulse width of the not_regulating pulse and the degree of failure to regulate finds its greatest usefulness, namely for permitting the establishment of a particular degree of failure to regulate at which either an alarm signal will be generated or a compensating adjustment in the driver circuit may be automatically made.

Figure 8:
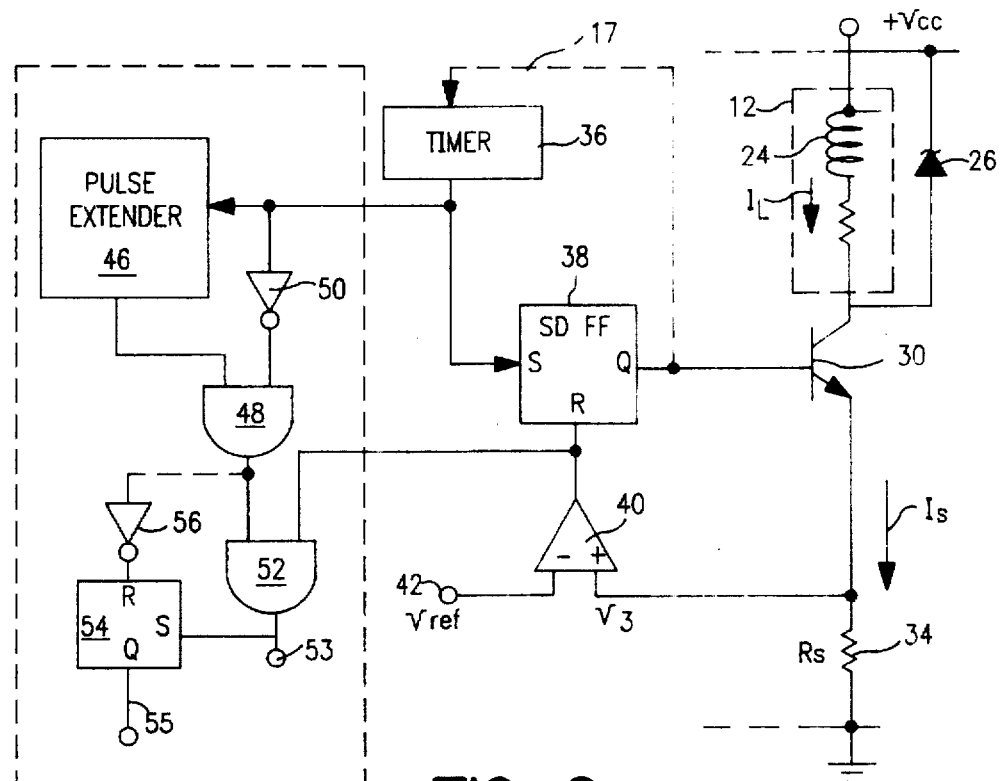
FIG. 8 shows a circuit diagram of a second preferred embodiment of a PWM controlled driver of this invention.
Figure 10A:
FIGS. 10a through 10h show waveforms in the driver of FIG. 8 for a low level of applied reference voltage, $V_{ref}$.
Figure 10B:
Figure 10C:
Figure 10D:
Figure 10E:
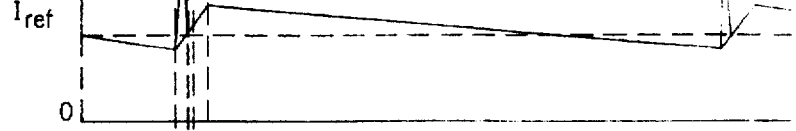
Figure 10F:
Figure 10G:
Figure 10H:
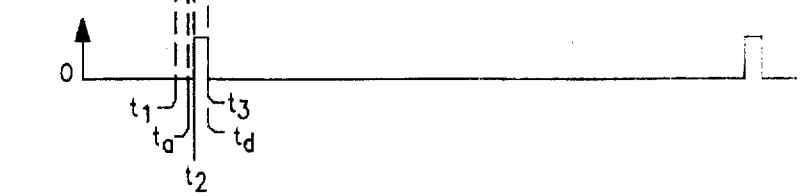
Figure 11A:
FIGS. 11a through 11h show waveforms in the driver of FIG. 8 for about the same low level of the applied reference voltage, $V_{ref}$, and for driver turn-off delay $t_a$ to $t_d$ being smaller than the sample time t2 to t3.
Figure 11B:
Figure 11C:
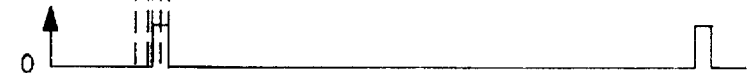
Figure 11D:
Figure 11E:
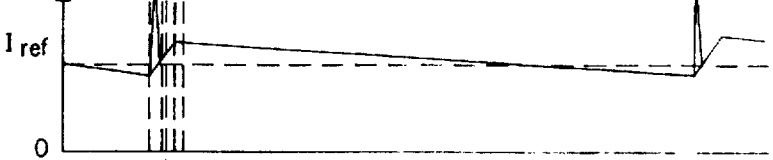
Figure 11F:
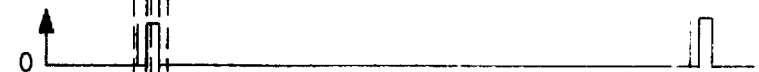
Figure 11G:
Figure 11H:
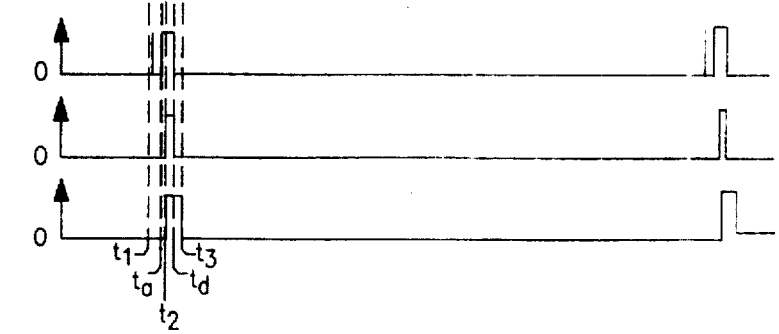

The driver circuit of FIG. 8 employs all of the same components as does the driver circuit of FIG. 4, but the direct connection made between the set input of latch 38 and the output of the pulse extend circuit 46 has been removed and a new connection has been made between the timer 16 and the set input of latch 38. Added to the circuit are latch 54 and invertor 56. Latch 54 has a reset input that is the inverted output of AND gate 48 (FIG. 9c) and a set input that is connected to the output of AND gate 52. In FIG. 8 therefore, the timer pulse is the set pulse and thus the circuit differs from FIG. 4 in that the PWM latch 38 may be reset during the sample interval from $t_2$ to $t_3$ by the comparator 40.

FIGS. 9a, 9b, 9c, 9d, 9e, 9f, 9g and 9h show the behavior of the circuit of FIG. 8 under the load conditions in which for a moderately low applied reference voltage $V_{ref}$, for the situation wherein $t_a$ occurs during the sample time from $t_2$ to $t_3$. As can be seen in the load current waveform of FIG. 9e, good regulation is obtained because the set signal to the PWM latch 38 is the timer signal (FIG. 9a) which is low during the entire sample time. Thus in the type-B driver of FIG. 8), the PWM latch 38 is not inhibited from being reset during the sample time, from $t_2$ to $t_3$.

It is instructive to compare the waveforms in FIGS. 6a through 6g, that represent performance of the driver circuit of FIG. 4 under one set of operating conditions, with the waveforms in FIGS. 9a through 9g of the driver circuit of FIG. 8 that are obtained under the same operating conditions of load and $V_{ref}$ level. The PWM latch 38 in the type-A driver of FIG. 4 cannot be reset during the sample time, $t_2$ to $t_3$, and the type-B driver of FIG. 8 clearly provides better peak current regulation in this comparison.

However because in type-B detectors the PWM latch 38 may be reset during the sample time, and thus the duty cycle of the PWM controller may be affected the output of the AND gate 52 in the case as shown in FIG. 9g no longer indicates the presence of poor current regulation. Rather the output of AND gate 52, as shown in FIG. 9g, indicates that the PWM controller is nearing the low current level at which poor current regulation will occur. More specifically, the on time of the PWM controller has dropped to within the sample pulse width of the minimum on time.

There is then produced at the output of the AND gate 52 a signal, of width ta to t3, that warns that the load current $I_L$ is nearing the point at which the PWM driver circuit will no longer be able to regulate load current. Furthermore the width of this type-B not_regulating pulse, the duty factor of a type-B not regulating pulse and the average voltage of the total type-B not_regulating signal (FIG. 9g) from AND gate 52, are each measures of the degree to which the load current $I_L$ is nearing the point at which the PWM driver circuit will no longer be able to regulate load current.

If the circuit delays are such that the drivers turn off delay is greater than the sample time, then in that case, when the pulse width of the type-B not_regulating pulse is equal to the sample pulse width the PWM circuit has dropped to the minimum on time and thus the Vref signal is at the minimum level or below the minimum level at which load current can be regulated.

The case where the Vref signal is below the minimum level at which load current can be regulated is shown in FIGS. 10a, 10b, 10c, 10d, 10e, 10f, 10g and 10h representing respectively, timer signal, pulse extend signal, sample signal, Q of latch 38 load current, reset signal, and the type-B not_regulating signal output of AND gate 52 and the latched type-B not_regulating signal output of latch 54, for the circuit of FIG. 8.

If the circuit delays are such that the drivers turn off delay is less than the sample time, the width of the not_regulating pulse at the output conductor 53 of and gate 52 will not necessarily relate to the degree of failure to regulate because the reset signal may go low prior to the end of the sample pulse. In this case, optional latch 54 may be used in conjunction with optional invertor 56 to provide a latched type-B not_regulating pulse that maintains the previously aforementioned proportionality between the width of this pulse at conductor 53 and the degree to which the PWM controller is nearing the low current level at which poor current regulation will occur.

The drivers turn off delay may be less than the sample time in systems where the drivers have fast switching speeds, as is the case when the output driver transistors are MOS devices. Furthermore, in some systems the sample time may be required to be of a certain duration to allow other controlling circuitry in the system to make use of the proportionality to the width of the type-B not_regulating pulse. It is in systems such as these that the latched type-B not_regulating pulse may be used to maintain the aforementioned proportionality.

In the driver of FIG. 8, the situation wherein the $V_{ref}$ signal is below the minimum level at which load current can be regulated and the drivers turn off delay $t_a$ to $t_d$ is less than the sample time $t_2$ to $t_3$, is represented by the waveforms shown in FIGS. 11a, 11b, 11c, 11d, 11e, 11f, 11g and 11h.

Figure 12:
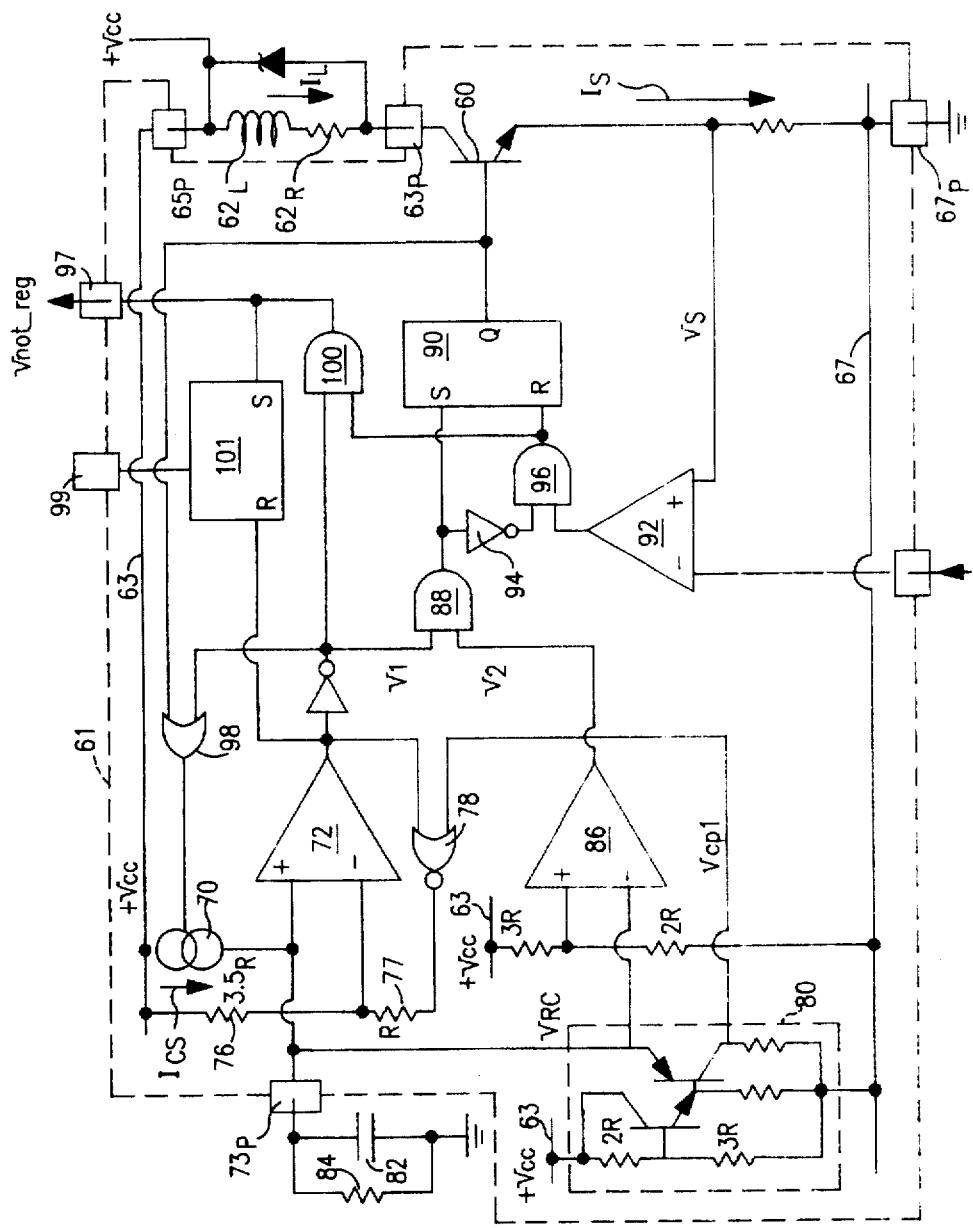
FIG. 12 shows a circuit diagram of a third preferred embodiment of a PWM controlled driver of this invention.

The driver circuit of FIG. 12 is formed in an integrated circuit chip 61 and has a driver transistor 60 with an external load (inductor 62L and resistor 62R) connected, via the integrated circuit terminal pad 63p, between the driver transistor collector and the +Vcc bus 65. Bus 65p is connected to the terminal pad 65p to which a positive DC supply voltage source (not shown) may be connected with respect to the ground pad 67p. A load-current sensing resistor 64 is connected from emitter of transistor 60 to the ground bus 65p, serving as a current-to-voltage transducer to produce a sensing voltage Vs that is proportional to the load current $I_L$ when transistor 60 is turned on. The circuit in FIG. 12 is a specific implementation of the timing and control functions of a circuit that produces a type-B not_regulating signal, as does the circuit in FIG. 8. In the circuit of FIG. 12 the timing for the pulse extender and timer functions for the integrated circuit are determined by the selection of an external capacitor 82 and resistor 84.

For the driver circuit of FIG. 12, each of the waveforms in FIGS. 13a, 13b, 13c, 13d, 13e, 13f, 13g, 13h, 13j, 13k, and 13m show a first PWM period corresponding to an operating condition in which the load current rises to the point at which Vs reaches the level of the applied Vref after the rise in the capacitor voltage, $V_{RC}$, (FIG. 13c) becomes clamped;

and these waveforms show a second PWM period corresponding to an operating condition in the PWM driver circuit of FIG. 12 in which the load current rises to point at which Vs has reached the level of the applied Vref before the rise in the charging capacitor voltage, $V_{RC}$, (FIG. 13c) becomes clamped.

The PWM control circuit includes the pull-up current source 70, and an oscillator comparator 72 with one input connected to the current source 70 and to the terminal pad 73p, and the other input connected to a connection point of a voltage divider made up of resistors 76 and 77 that are connected between the Vcc bus 63 and the output of an inverting OR gate 78. The control circuit further includes an RC clamp circuit 80 comprised of an NPN transistor, a PNP transistor and four resistors. An oscillator timing capacitor 82 and the parallel connected resistor 84 are connected between the pad 73p and ground.

Referring now to FIGS. 13a through 13m, prior to time $t_1$, the output of comparator 72 is high resulting in V1 and the output of NOR gate 78 being low. The Q output of PWM latch 90 is low and thus the output of the OR gate 98 is low resulting in the current source 70 being switched off. Also as a result of the Q output of the PWM latch 90 being low the driving transistor 60 is turned off and as a result the load current is decaying. The voltage on the capacitor 82 (FIG. 13c) is being discharged by resistor 84. The output of NOR gate 78 is nearly at ground and thus the resistor divider comprised of resistors 76 and 77 sets the voltage on the negative input to the comparator 72.

When at time $t_1$ the voltage on capacitor 82 drops below the voltage set by the resistor divider (resistors 76 and 77), the output of comparator 72 goes low resulting in V1 going high so that the output of the OR gate 98 goes high and thus the current source 70 is switched on. Also as a result of comparator 72 going low at time $t_1$, and Vcp1 already being low, the output of NOR gate 78 goes high at time $t_1$ thereby raising the voltage on the negative input of comparator 72 to nearly Vcc volts. The current-source current Ics (FIG. 13a) turns on at time $t_1$ and charges the capacitor 82 until at time $t_3$ clamp 80 clamps the capacitor voltage VRC (FIG. 13c) to a predetermined fixed voltage by diverting the current-source current away from the capacitor 82.

The diverted current produces a first clamp-output voltage VCP1 (FIG. 13b) beginning at $t_3$ and terminating at $t_a$, and Vcp1 is applied to one input of the inverting OR gate 78 putting the bottom of resistor 77 at essentially zero volts during the interval $t_3$ to $t_a$. The output of the oscillator comparator 72 (FIG. 13d) that had become low at time $t_1$, becomes high at time $t_3$ when the diverted current-source current began flowing in the clamp 80 and AND gate 78 reduces the voltage divider voltage at the negative input to comparator 72 to less than $V_{RC}$.

The minus input of a sample comparator 86 is also connected to the pad 73p and compares $V_{RC}$ to a lower voltage-divider voltage that is lower than voltage to which clamp 80 holds $V_{RC}$. This leads to a change of the output logic voltage V2 from comparator 86 from a high to a low level at time $t_2$, which is earlier than $t_3$. This low from comparator 86 (V2) in conjunction with the high V1 signal produces a high signal at the output of the AND gate 88 producing a set signal from $t_1$ to $t_2$ (FIG. 13f) to set the latch 90, which is a simple set/reset type latch (not a set dominated latch).

Figure 13:
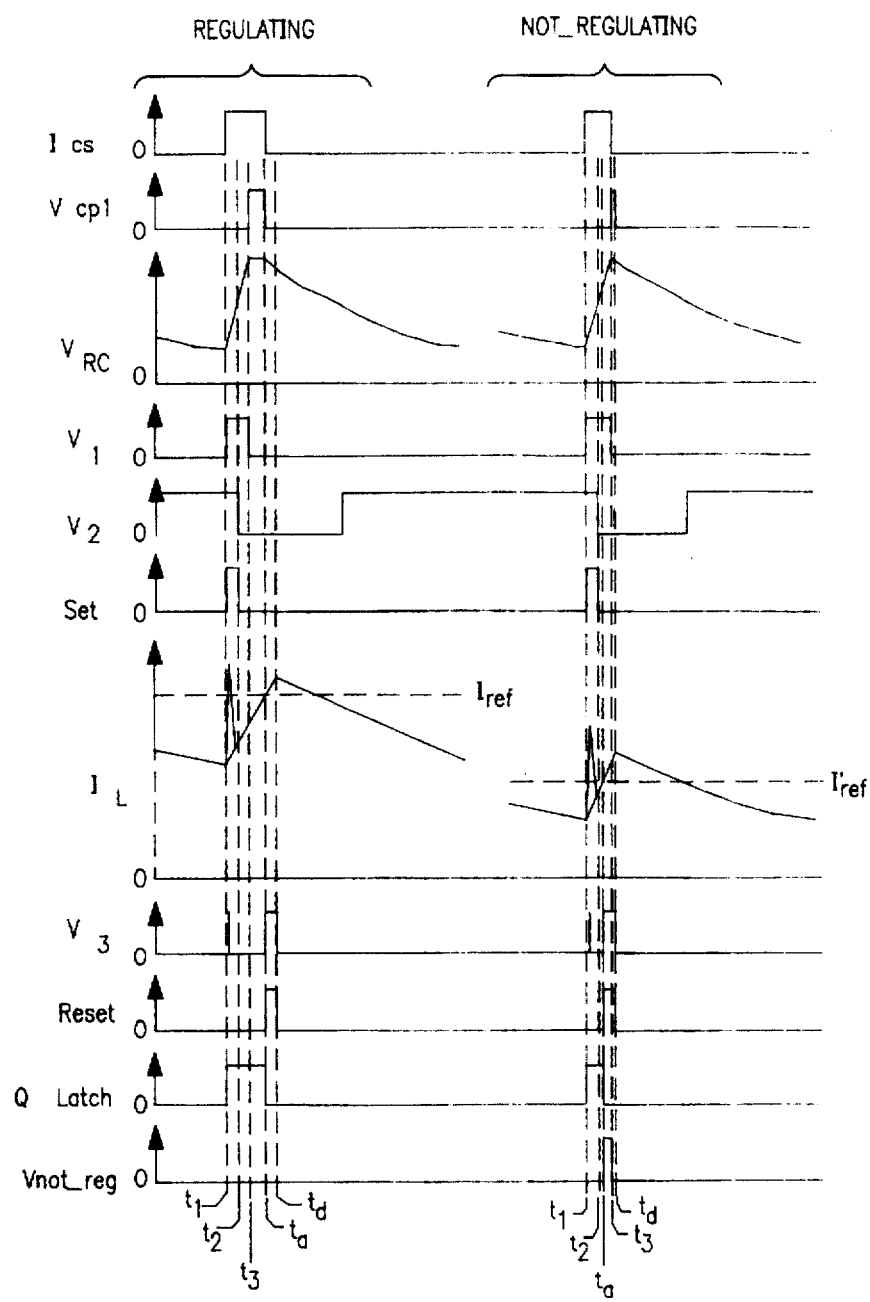
FIG. 13a shows a waveform of the current, Ics, in the switched current source 70.
FIG. 13b shows a waveform of the logic signal output from the clamp circuit 80.
FIG. 13c shows a waveform of the charging voltage, $V_{RC}$, across the external charging capacitor 82.
FIG. 13d shows a waveform of the logic signal $V_1$.
FIG. 13e shows a waveform of the logic signal $V_2$.
FIG. 13f shows a waveform of the set signal to the PWM latch 90.
FIG. 13g shows a waveform of load current having superimposed thereon the sensed-current spikes coincident with the leading edges of the respective set pulses.
FIG. 13h shows a waveform of the logic signal V3.
FIG. 13j shows a waveform of the reset signal at the output of the comparator 92.
FIG. 13k shows a waveform of the gating pulse from the Q output of the PWM latch 90.
FIG. 13m shows a waveform of the not_regulating signal at the output of the AND gate 100.

Thus the positive pulses in the signal V1 in FIG. 13d correspond to the extend pulses of FIGS. 9b relating to the driver circuit of FIG. 8, all serving to determine the time $t_3$ at which the sampling period ends.

The negative pulses in the signal V2 (FIG. 13e) determine the time $t_2$ at which the set pulses (FIG. 13f) terminate and the sampling period begins. In this way the extent of the sampling period $t_2$ to $t_3$, during which an excess load current over $I_{ref}$ ($V_{ref}/Rs$) will be detected, is determined. This contrasts with the method of establishment of the time $t_2$ in the circuit of FIG. 8 wherein the time $t_3$ is simply the termination of the fixed set pulse from the timer 36, and the sample AND gate 48 in FIG. 8 produces a positive sample pulse from $t_2$ to $t_3$ as seen in FIG. 9c where $t_3$ is the termination of the extend pulse (FIG. 9b).

With further reference to FIGS. 13a through 13m the signal V1 has a pulse width $t_1$ to $t_2$ during which the current-spike-induced voltage pulse in the sensing voltage Vs appears in the output of comparator 92 but is blanked from resetting the PWM latch 90. For blanking to be effected it is necessary that the reset signal from comparator 92 to the reset input of the simple set/reset type latch 90 (FIG. 13j) be temporarily blocked, such as by the invertor 94 and AND gate 96. Thus the combination of latch 90, invertor 94 and AND gate 96 form a set dominant latch.

A type-B not-regulating pulse (FIG. 13m) is produced at the output of AND gate 100 that is connected to the integrated circuit pad 97. The type-B not_reg signal, $V_{not\_reg}$, is high during coincidence of highs in the reset signal from the output of AND gate 96 and the signal voltage, V1.

The type-B not-regulating pulse produced by the circuit of FIG. 12 has the same properties as the type-B not_regulating pulse produced by the circuit of FIG. 8. Furthermore, latch 101 may be included in the PWM driver circuit of FIG. 12 with the set input connected to the output of AND gate 100 and the reset input connected to the output of the comparator 72. Latch 101 produces at the Q output a latched type-B not-regulating pulse at pad 99 that has the same properties as the latched type-B not-regulating pulse produced by the circuit of FIG. 8.

In the PWM driver circuit of FIG. 12, the capacitance and resistance respectively of capacitor 82 the resistor 84 along with voltage divider 87 that is connected to the positive input of comparator 86 determines the time $t_2$ at which the PWM latch may be reset by the sense comparator 92. Each inductive driver and the load 62 contribute to the current spikes that are typically of different duration. For driver circuits that provide a fixed period for blanking of latch resetting, or otherwise provide a fixed period for holding the latch set following each timer pulse, the blanking time $t_1$ to $t_2$ must be made wide enough to account for the broadest current spike produced by any of the anticipated loads.

In some few PWM driver circuits, the charge discharge spikes are low enough that they will not be detected by the sense comparator. In such cases there is no need for a set-dominated PWM latch, and the Set pulse at the set input of the PWM latch may then simply be an impulse. Also in such cases, the PWM driver circuit may be simplified since there will no longer be any need to establish a time $t_2$, and the sample time can extend from $t_1$ to $t_3$. In the circuits described above, $t_2$ will be made essentially equal $t_1$, and the level of $V_{ref}$ below which the PINM driver circuit begins to fail to regulate will be reduced.

But PWM driver regulation begins to be degraded at the low value of the applied reference voltage $V_{ref}$ at which Va (the time at which the sense voltage Vs has risen to equal $V_{ref}$) occurs before the termination of blanking $t_2$. Thus shorter blanking times reduce the range of reference voltages at which regulation is degraded. In the driver of FIG.

12, the user may change the blanking time to be compatible with any particular driver load by adjusting the value of the capacitor 82, in a manner described in more detail the above mentioned patent U.S. Pat. No. 5,057,765.

The PWM control circuit of FIG. 12 is described in more detail in the above-noted provisional patent application Serial No. 60/001,234. That patent application also describes other uses to which the not-regulating detectors of this invention may be put, and for these reasons that application is incorporated by reference herein.

Figure 14:
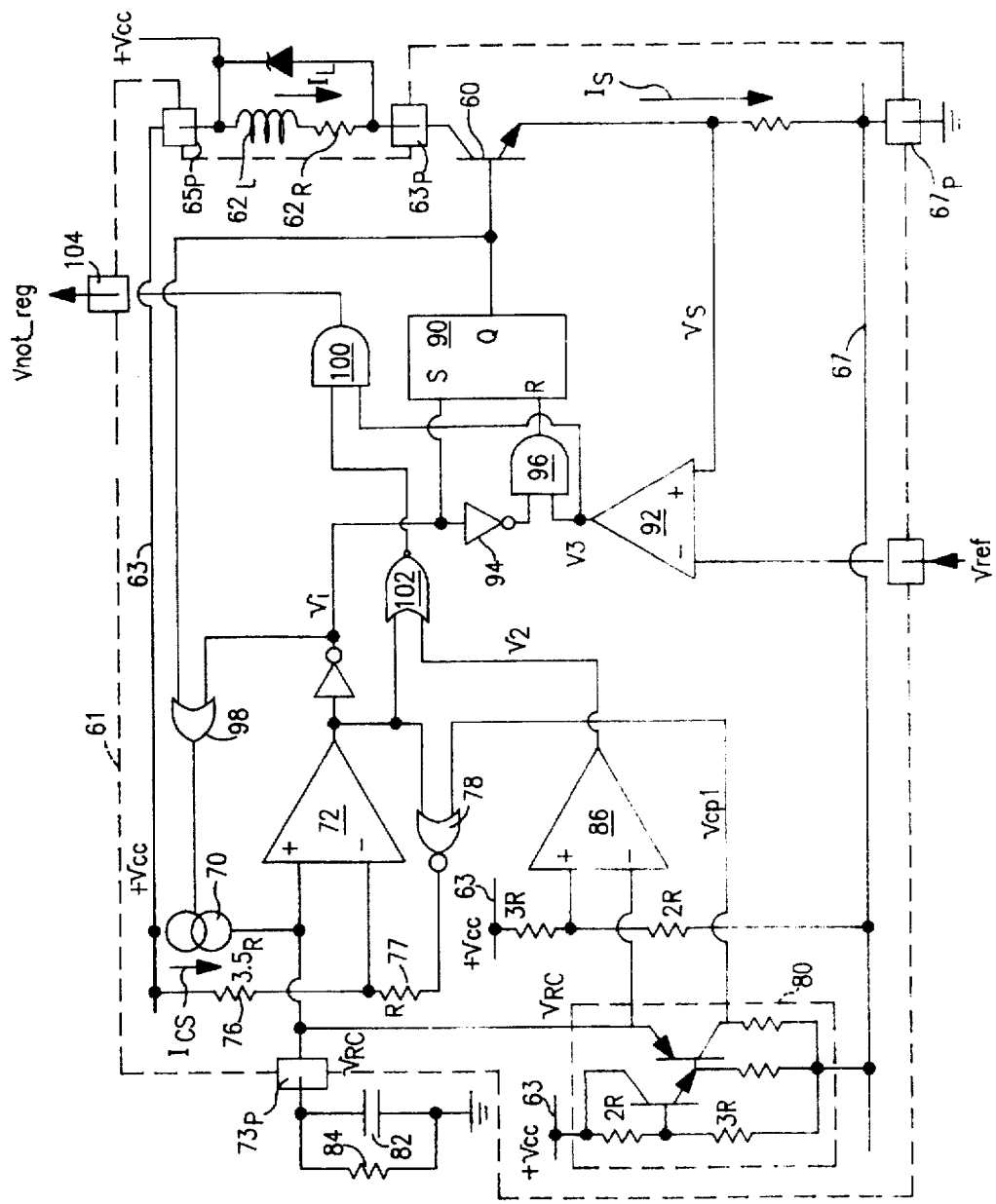
FIG. 14 shows a circuit diagram of a fourth preferred embodiment of a PWM controlled driver of this invention.

The circuit in FIG. 14 is a specific implementation of the timing and control functions of a circuit that produces a not-regulating type signal similar in nature to the circuit in FIG. 4. In the circuit of FIG. 14 the timing for the pulse extender and timer functions for the integrated circuit are determined by the selection of an external capacitor 82 and resistor 84.

The driver circuit of FIG. 14 employs all of the same components as does the driver circuit of FIG. 12, with the exception that latch 101 and AND gate 88 including their corresponding direct connections have been removed. NOR gate 102 has been added to the circuit with ones input connected to the output of comparator 72 and the other input connected to the output of comparator 86.

The direct connection made between the inverted output of comparator 72 and the input of AND gate 100 has been removed and a new connection is made between the output of NOR gate 102 and said input of AND gate 100. The direct connection made between the output of AND gate 96 and the input of AND gate 100 has been removed and a new connection is made between the output of comparator 92 and the said input of AND gate 100. A new connection is also made from the inverted output of comparator 72 to the input of the invertor 94 and the set input of the latch 90.

In the circuit of FIG. 14 therefore, during the time that the capacitor is charging (FIG. 15c) the set input (FIG. 15f) to the latch 90 is held high and thus the circuit differs from FIG. 12 in that the PWM latch 90 may not be reset during the sample time from $t_2$ to $t_3$ by the current sense comparator 92, as seen in FIGS. 15j and 15k.

During the charging time of capacitor 82 the timing-capacitor voltage $V_{RC}$ exceeds the divider-voltage on the positive input of comparator 86 at time $t_2$ (FIG. 15e) causing the output of NOR gate 102 to go positive. Thus during the time from $t_2$ to $t_3$ coincidence between the over current condition (FIG. 15h) as sensed by the current comparator 92 and the already high output of NOR gate 102 will cause AND gate 100 to produce a type-A not-regulating pulse (FIG. 15m) that is connected to the integrated circuit pad 104. The not-regulating pulse produced by the circuit of FIG. 14 has the same properties as the type-A not-regulating pulse produced by the circuit of FIG. 4.

Comparison of a PWM driver with a type-A not__regulating detector and a PWM driver with a type-B not__regulating detector indicates advantages in different applications for each.

If the sum of the sample time and the blanking time (the interval from $t_1$ to $t_3$) is set equal for both types of circuits then both circuits will begin to produce an output signal when the on time of the PWM controller has dropped to the point at which the over current condition occurs prior to time $t_3$. All delays in the circuit being equal this will occur at the same level of load current for both circuits.

However in the case of the PWM driver with a type-B not-regulating detector the on time of the PWM control circuit may be reduced to a lower level because the PWM latch may be reset during the sample time as in the case of the type-A not-regulating detector. Thus if an abrupt decrease in $V_{ref}$ occurs, that puts $V_{ref}$ at a level at which load current may be well regulated, but the inductance of the load causes the load current to remain high and thus out of regulation for some time, then the shorter minimum on time of the PWM driver with a type-B not-regulating detector will allow the system to come back into regulation faster than in the case of a PWM driver with a type-A not-regulating detector.

The PWM driver with a type-A not-regulating detector has an advantage in systems where the duration of the type-A not-regulating signal is used to determine when and to what degree to apply four quadrant PWM to thereby improve the regulation of the load current. In such a system if the on time of the PWM controller and the width of the type-A not-regulating signal (and thus the amount of applied four quadrant PWM) are both allowed to change at the same time then a peak in the gain of the system will occur that complicates the compensation required to obtain stable operation.

We claim:

1. A pulse width modulated (PWM) driver circuit for driving an inductive load including a driver transistor, a pair of driver-circuit load terminals to which a load may be connected, and a load-current sensing transducer for producing a load-current sense voltage that is directly related to the load current; said transistor and said pair of load terminals connected in series between a pair of DC supply voltage busses, a PWM reference-signal input conductor to which a driver-control reference voltage may be applied, and a sense-comparator having one input connected to said sensing transducer and having another input connected to said reference-signal input conductor for during each PWM period producing at a time $t_a$ a pulse at the output of the sense-comparator when the sense voltage exceeds the applied reference voltage, wherein the improvement comprises:

a PWM bridge-control circuit means connected to the output of said sense-comparator and having an output connected to the control element of said driver transistor for repeatedly producing at said driver-transistor gating element a gating pulse initiated at time $t_1$ for initiating each PWM period and for turning on said driver transistor, said driver transistor delaying turning off until a time $t_d$ after $t_a$;

a sample-time logic means connected to said PWM bridge-control circuit for during each PWM period producing at least one logic pulse that includes a first logic-level transition at a time $t_2$ after $t_1$ and producing a second logic-level transition at a time $t_3$ after $t_2$ to define a sample-time interval $t_2$ to $t_3$; and a not__regulating pulse generator means having one input connected to the output of said sample-time logic means and having another input connected to the output of said sense-comparator for producing a not__reg pulse only during a sample-time interval, $t_2$ to $t_3$, in each PWM period and only when during a sample-time interval when the sense voltage exceeds the driver-control reference voltage that may be applied to said reference signal input conductor.

2. The PWM driver circuit of claim 1 wherein said PWM bridge-control circuit means is comprised of a timer for generating PWM timer pulses, each timer pulse being initiated at time $t_1$ and terminated at time $t_2$; said sample-time logic means including a pulse extend means having an input connected to said timer for generating an extend pulse initiated simultaneously at $t_1$ with each. timer pulse and terminated after the termination at $t_2$ of each timer pulse; and a set-dominant set-reset latch having a set input connected to the output of said timer, having a reset input connected to the output of said sense comparator, and having an output connected to said driver-transistor control element; said sample-time-termination logic means connected to said timer in said PWM bridge-control circuit.

3. The PWM driver circuit of claim 1 wherein said PWM bridge-control circuit means is comprised of a timer for generating PWM timer pulses, each timer pulse being initiated at time $t_1$ and terminated at time $t_2$; said sample-time logic means including a pulse extend means having an input connected to said timer for generating an extend pulse initiated simultaneously at $t_1$ with each. timer pulse and terminated after the termination at $t_2$ of each timer pulse; and a set-dominant set-reset latch having a set input connected to the output of said timer, having a reset input connected to the output of said sense comparator, and having an output connected to said driver-transistor control element; said sample-time-termination logic means connected to said timer in said PWM bridge-control circuit.

4. The PWM driver circuit of claim 2 wherein said not_regulating pulse generator means is connected to the outputs of said pulse extend means, said timer, and said sense comparator.

5. The PWM driver circuit of claim 3 wherein said not_regulating pulse generator means is connected to the outputs of said pulse extend means, said timer, and said sense comparator.

6. The PWM driver circuit of claim 1 wherein said PWM control circuit means is not only for just turning on said driver transistor but for turning on and holding on said driver transistor until termination of the sample time at time $t_3$, said driver transistor delaying turning off until at a time $t_d$ after time $t_3$.

7. The PWM driver circuit of claim 1 wherein said PWM bridge-control circuit means is comprised of an R-C oscillator timer having first, second and third outputs for repeatedly generating at said first output timer pulses initiated at times $t_1$ to define PWM periods between successive times $t_1$; a set-reset latch having a set input connected to said first output of said oscillator timer, having a reset input connected to the output of said sense comparator, and having an output connected to said driver-transistor control element; said sample-time logic means connected to said oscillator timer in said PWM bridge-control circuit, said oscillator timer being additionally for in each PWM period generating at said second output a logic signal $V_2$ having a logic transition at the time $t_2$ after time $t_1$, and for in each PWM period generating at said third output a logic signal $V_1$ having a transition at: time $t_3$ after $t_2$ to define the sample time interval from time $t_2$ to time $t_3$.

8. A method for generating a not_regulating signal, in a PWM driver circuit having a driver transistor and an inductive load and including a pulse-width-modulator (PWM) load-current controller, the method being of the kind including connecting the output of a set-dominated set-reset latch to the gating input of a transistor driver transistor, repeatedly at times $t_1$ setting the latch by a timer-pulse generator that generates timer pulses of a predetermined width, from $t_1$ to $t_2$, setting and blocking the latch from being reset during a timer pulse, sensing the inductive load current and generating a sensing voltage that is proportional to the load current, generating a PWM-control reference-voltage, and during each PWM period between adjacent times $t_1$ resetting the latch when the sensing voltage exceeds the reference voltage, wherein the improvement comprises:

a) defining a predetermined sample-time interval, $t_2$ to $t_3$, during each PWM period; and b) generating a not_regulating pulse during the predetermined sample-time interval only when the sensing voltage exceeds the reference voltage, so that the not_regulating pulse indicates an operating condition wherein the PWM control circuit is not regulating the load current and the width of the not_regulating pulse is a measure of the degree to which the PWM system fails to regulate.

9. The method for generating a not_regulating signal of claim 8 wherein said defining a predetermined sample-time interval is accomplished by generating an extended pulse having a leading edge coincident at time $t_1$ with the leading edge of one of the timer pulses, and having a trailing edge occurring at a time $t_3$ which is later than the termination at time $t_2$ of the timer pulse.

10. A pulse width modulated (PWM) driver circuit including a driver transistor; a pair of driver-circuit load terminals to which an inductive load may be connected; a load-current sensing transducer for producing a sense voltage that is directly related to the load current, said driver transistor and said pair of load terminals connected in series between a pair of DC supply voltage busses; a PWM reference-signal input conductor to which a driver-control reference voltage may be applied; and a sense-comparator having one input connected to said sensing transducer and having another input connected to said reference-signal input conductor for producing at time $t_a$ a pulse at the output of the sense-comparator when the sense voltage exceeds the applied reference voltage, wherein the improvement comprises:

a PWM control circuit means connected to the output of said sense-comparator and having an output connected to the control element of said driver transistor for repeatedly producing at the gating element of said driver-transistor during each PWM period a gating pulse for turning on said driver transistor, the gating pulse starting at a time $t_1$;

a sample-time logic means connected to said PWM control circuit for producing logic pulses that include a first logic-level transition at time $t_2$ occurring after $t_1$ and while said driver transistor is still on, and further includes a second logic-level transition at time $t_3$ occurring after $t_2$, to define a sample time from $t_2$ to $t_3$ during each PWM period; and a not_regulating pulse generator means having one input connected to said sample-time logic means and having another input connected to said sense-comparator for producing a not_reg pulse only when during a sample-time in each PWM period the sense voltage exceeds the driver-control reference voltage that may be applied to said reference signal input conductor.

11. The PWM driver circuit of claim 10 wherein said PWM driver is of an A-type said PWM control circuit means being additionally for terminating the gating pulse only after time $t_a$ and time $t_3$.

12. The PWM driver circuit of claim 10 wherein said PWM driver is of a B-type, said PWM control circuit means being additionally for terminating the gating pulse at time $t_a$.

13. A method for generating a not_regulating signal in a PWM driver circuit having a driver transistor with an inductive load comprising:

a) repeatedly generating timer pulses at successive times $t_1$ to initiate each of a plurality of successive PWM periods;

b) sensing the load current and generating a sense voltage that is proportional to the load current;

c) generating a reference control voltage of a level at which the sense voltage level, and that of the corresponding load current, are desired to be controlled;

e) during each PWM period producing at a time $t_a$ an excess-load-current detection pulse when sense voltage corresponding to the load current first exceeds the applied reference control voltage;

f) generating a gating pulse at the gating-element of said driver-transistor initiated at each time $t_1$ and turning on said driver transistor by the gating pulse, said driver transistor delaying turning off until a time $t_d$ after the occurrence of the excess-load-current detection pulse at time $t_a$;

g) during each PWM period producing a sample-logic pulse that includes a first logic-level transition at a time $t_2$ after $t_1$, and producing a second logic-level transition at a time $t_3$ after $t_2$ to define a sample-time $t_2$ to $t_3$; and h) during a sample-time, $t_2$ to $t_3$ in each PWM period generating a not_regulating pulse only when simultaneously the load current exceeds the reference-control current.

14. The method for generating a not_regulating signal of claim 13 wherein the turning on of said driver transistor by the gating pulse includes holding on said driver transistor for the duration of the gating pulse.

15. The method for generating a not_regulating signal of claim 13 wherein the width of the not_regulating pulse is a measure of the degree to which the PWM system fails to regulate.

\* \* \* \* \*